(12) United States Patent
Repp et al.

(10) Patent No.: US 7,176,148 B2
(45) Date of Patent: Feb. 13, 2007

(54) QUILTING METHOD AND SYSTEM

(75) Inventors: Jilene A. Repp, Hartland, WI (US); Francis A. Yogerst, West Bend, WI (US)

(73) Assignee: June Tailor, Inc., Richfield, WI (US)

( * ) Notice: Subject to any disclaimer, the term of this patent is extended or adjusted under 35 U.S.C. 154(b) by 229 days.

(21) Appl. No.: 10/799,298

(22) Filed: Mar. 12, 2004

(65) Prior Publication Data

US 2004/0170815 A1 Sep. 2, 2004

Related U.S. Application Data

(60) Continuation of application No. 09/900,927, filed on Jul. 9, 2001, now Pat. No. 6,838,398, which is a division of application No. 09/521,810, filed on Mar. 9, 2000, now Pat. No. 6,261,397.

(51) Int. Cl.
*B32B 27/12* (2006.01)
*B32B 3/00* (2006.01)

(52) U.S. Cl. .................. 442/149; 442/150; 442/152; 428/190; 428/191

(58) Field of Classification Search ............... 442/327, 442/149, 150, 152, 333; 428/190, 191, 300.7, 428/343, 347
See application file for complete search history.

(56) References Cited

U.S. PATENT DOCUMENTS 2,126,756 A * 8/1938 Dreyfus .................... 442/103
3,147,490 A * 9/1964 Allen et al. ................... 2/84

OTHER PUBLICATIONS

The File History for U.S. Appl. No. 10/196,643, filed Jul. 15, 2002, (186 pages).
U.S. Appl. No. 10/196,643, filed, Jul. 15, 2002, (59 pages).

* cited by examiner

*Primary Examiner*—Terrel Morris
*Assistant Examiner*—Lynda Salvatore
(74) *Attorney, Agent, or Firm*—Foley & Lardner LLP

(57) ABSTRACT

A commercially available product, of a type having a batting with a softness and flexibility and configured for use in the formation of a quilt, where the quilt has at least one cover to be securably attached to the batting, includes a composite member sold in at least one desirable size for making a quilt and formed of the batting and an adhesive material as an article of manufacture, is disclosed. The batting consists of a fibrous material and the adhesive material includes a water-soluble material and is effective to form a removable bond at the opposing faces of the batting, so that the quilt may be formed by at least temporary attachment of the cover to the batting by the bond and the bond is removable after formation of the quilt.

45 Claims, 1 Drawing Sheet

QUILTING METHOD AND SYSTEM

CROSS-REFERENCE TO RELATED PATENT APPLICATIONS

The present Application is a continuation of U.S. patent application Ser. No. 09/900,927, filed Jul. 9, 2001, now U.S. Pat. No. 6,838,398 which is a division of U.S. patent application Ser. No. 09/521,810, filed Mar. 9, 2000, which issued as U.S. Pat. No. 6,261,397 on Jul. 17, 2001, both of which are incorporated herein by reference in their entirety.

BACKGROUND

A quilt generally consists of a top cover and a bottom cover with an interposed soft batting. The upper or top cover may be formed by sewing small pieces (of cloth) to each other to form a decorative cover. The top cover and bottom cover are further interconnected in multiple spaced locations by various elements (such as stitching of yarn or thread) which pass through the batting to hold the batting in place; these elements may further contribute to the decorative effect.

It is known to use a method of quilting wherein the covers are first manually secured to each other and the batting with temporary connections in the form of safety pins, tacking usually with a special gun, a basting with needle, or application of a spray set active liquid glue to temporarily hold the cover in place during the forming of the decorative cover (i.e., forming a finished quilt with a connection of the cover and batting). The temporary connections are then manually removed to finish the quilt. The attachment and removal of such temporary connections tends to be both tedious and time consuming.

It would be advantageous to provide a quilting method and system and particularly to a method and system for assembling of the top and bottom quilt covers to the opposite faces of a batting that is less tedious and time consuming.

SUMMARY

The present invention relates to a commercially available product including a batting of a type having a softness and flexibility and configured for use in the formation of a quilt, the quilt having at least one cover to be attached to the batting. The improvement includes a composite member having a size for making a quilt and formed of the batting and an adhesive material as an article of manufacture, where the batting consists essentially of cotton, polyester, or cotton-polyester and the adhesive material is water soluble and effective to provide a bond to secure the cover to the batting during formation of the quilt so that the bond is removable after formation of the quilt.

The present invention also relates to a commercially available product including a batting of a type having opposing faces and a softness and a flexibility and configured for use in the formation of a quilt, where the quilt has at least one cover to be attached to the batting. The improvement includes a composite member provided in at least one desirable size for quilting and formed of the batting and an adhesive material as an article of manufacture, where the batting consists of fibers and the adhesive material comprises a water soluble material configured to form a bond at the opposing faces of the batting. Instructions are provided for securing the cover to the batting, so that a cover can be secured to the batting with the bond formed by the adhesive material before the cover is attached to the batting by spaced apart connectors and the bond can be removed after the cover is attached to the batting with the connectors.

The present invention further relates to a commercially available product of a type having a batting with a softness and flexibility and configured for use in the formation of a quilt, where the quilt has at least one cover to be securably attached to the batting. The improvement includes a composite member sold in at least one desirable size for making a quilt and formed of the batting and an adhesive material as an article of manufacture, where the batting consists of a fibrous material and the adhesive material includes a water-soluble material effective to form a removable bond at the opposing faces of the batting. The quilt may be formed by at least temporary attachment of the cover to the batting by the bond and the bond is removable after formation of the quilt

DESCRIPTION OF PREFERRED AND OTHER EXEMPLARY EMBODIMENTS

Figure 1:
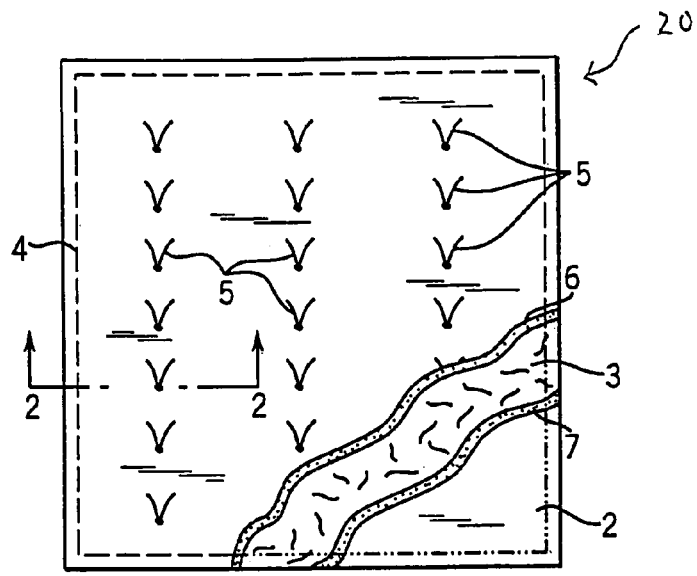
FIG. 1 is a fragmentary top plan view of a quilt (with parts broken away to show detail of the construction) according to an exemplary embodiment of the system and method.
Figure 2:
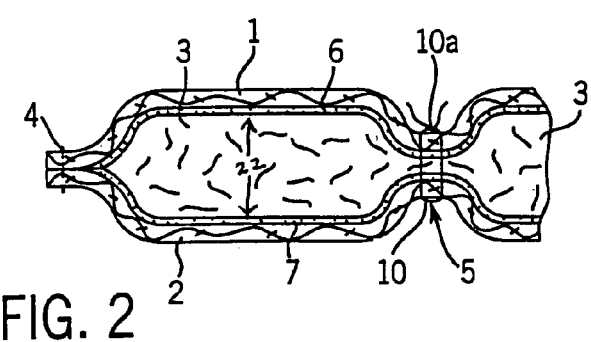
FIG. 2 is a fragmentary cross-section side elevation view of the quilt taken generally on line 2—2 of FIG. 1.
Figure 4:
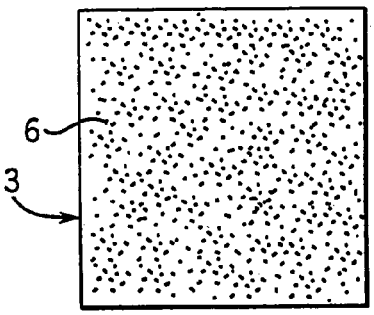
FIG. 4 is a top plan view of a batting forming a part of the quilt of FIGS. 1–3.

Referring to FIGS. 1 and 2, a quilt 20 is shown. Quilt 20 includes a top cover 1 and a bottom cover 2 separated by a central batting 3. As shown, batting 3 is formed of relatively thick and soft material. The batting has a thickness 22 which is substantially thicker than the cloth of top cover 1 and bottom cover 2. The outer edges of the quilt 20 are joined by a sewn connection 4 to enclose batting 3. According to any preferred embodiment, the covers and the batting are joined (by any of various methods) to form a decorative quilt cover (shown for purposes of illustration as including a plurality of spaced connectors 5). Each connector 5 is a thread of yarn or other material, which secures covers 1 and 2 and batting 3 together to form a decorative cover.

FIGS. 1 and 2 generally illustrate a typical quilt which may be hand prepared by individuals. Covers 1 and 2 are formed of a suitable cloth and batting 3 of a thicker and soft material. One cover may be formed of small individual pieces (not shown) which are separately sewn together to form a highly decorative cover. The covers and the batting are joined by temporary attachment (e.g., stitching or pins according to known methods) throughout the assembly temporarily to hold the covers and the batting in place during the completing (sewing) of the connector (after which the temporary attachment is manually removed). In the process of forming the quilt, covers and the batting are cut to the desired shape.

In accordance with an exemplary embodiment of the system and method shown in FIGS. 1 and 2, the quilt will include adhesive connections 6 and 7 at the interfaces of covers 1 and 2 to batting 3. Adhesive interfaces 6 and 7 are provided between batting 3 and covers 1 and/or 2; the adhesive may be selected such as to remain part of the quilt or may be removable by hand or machine washing of the quilt or other suitable means.

According to a particularly preferred embodiment, batting 3 is a preformed member with outer inactive adhesive coatings 6 and 7 applied to the faces on batting 3; adhesive interfaces 6 and 7 are relatively thin coatings (each is shown substantially enlarged for purposes of illustration). The coatings are such as to maintain a soft, flexible quilt if they are to remain a part of the final quilt. According to a particularly preferred embodiment, the inactive adhesive coating (interface) is activated after assembly with covers to form an active adhesive connection which joins the covers to the batting; the adhesive is heat activated to convert the inactive adhesive to a bonding state.

Figure 3:
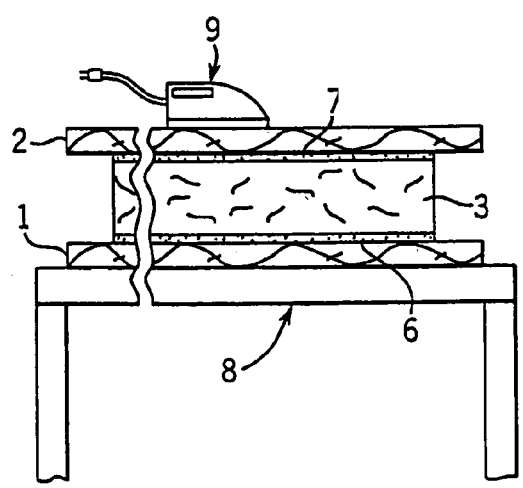
FIG. 3 is an enlarged partial view of the quilt of FIG. 1.

According to a particularly preferred embodiment, batting 3 has inactive adhesives 6 and 7 on the opposite sides or faces. As shown in FIG. 3, the batting assembly is placed on a support 8 (such as a table) with adhesive 7 on the exposed top face. Cover 2 is placed (in proper alignment) on batting 3. The coating is activated by heating. According to a particularly preferred embodiment, a conventional hot electric iron unit 9 is applied over the entire surface of cover 2. The heat of iron unit 9 activates inactive adhesive 7 and fixes cloth cover 2 to batting 3. Batting 3 with attached cover 2 is reversed upon table 8 and cover 1 is aligned with batting 3. Hot iron unit 9 is again moved over cover 1, activating inactive adhesive 6 on the abutting face of the batting to join cover 6 to batting 3.

Covers 1 and 2 are thereby sequentially fixed (at least temporarily) to batting 3, and the assembly is ready to receive connectors 5 (which are attached in a conventional manner). As shown in the FIGURES, according to a particularly preferred embodiment, connector 5 is generally a U-shaped thread 10 passing through the quilt assembly and secured by a knot 10a (as shown in FIG. 2). According to any exemplary embodiment, the quilt assembly may be constructed in accordance with one of the many conventional methods for forming a decorative covered quilt. After all or a significant forming of the decorative cover, the partially finished quilt is completed by securing the edges as by the sewn connection.

The adhesive used is preferably a thin layer which maintains the complete flexibility and softness of the quilt, and is preferably a material which may be removed by washing or otherwise treating of the quilt.

According to a particularly preferred embodiment, the adhesive is an adhesive such as sold under the trademark "Sol-U-Web" and commercially available from Freudenburg Nonwoven Group of 20 Industrial Avenue, Chelmsford, Mass. The adhesive is a water soluble nonwoven adhesive material having an inter-laced construction for bonding fabrics (or a less concentrated version of the adhesive as sold to the general public). The inactive adhesive is heat activated and may remain a part of the final quilt, or may be removed by hand or machine washing the quilt. According to other alternative embodiments, other adhesives suitable for use in the system and method may be used according to the teaching of the present invention.

In the construction of the batting according to a preferred embodiment, the adhesive is sprayed over the opposite faces of batting and forms a thin coating (suitable for a mass produce batting with in-place inactive adhesive). According to an exemplary embodiment, the batting is readily available in desirable sizes in a state for assembly to the covers by the quilting trade. The batting with adhesive is sold as a commercially available product. The activatable adhesive (or any other suitable inactive adhesive) may be supplied in the quilting market for appropriate application by the individual quilters. The factory mass-produced batting product provides accurate control of the applied adhesive and the benefits of mass production as well as quality control to produce an optimal system securing the covers to the batting.

The batting may be of any suitable material such as presently used in quilting or others having the necessary softness, and which is compatible with the adhesive. Acceptable present day batting is of various types and generally includes 100 percent cotton, cotton and polyester blends and 100 percent polyester. According to a particularly preferred embodiment, the batting has included 100 percent cotton and 100 percent polyester as well as 80 percent cotton/20 percent polyester; various other types of the 100 percent polyester batting may be identified as high loft, a low loft or a needle punch/traditional type. According to alternative embodiments, the batting product as presently produced are typical construction and are not limited with respect to the scope of the present system and method.

According to any preferred embodiment of the present invention, a high quality quilt may be produced which is equal to or better in quality than that produced with the time consuming and tedious prior art stitching or other methods.

According to a preferred embodiment of the system and method, a heat activated adhesive is applied to the batting which is then sold with proper instructions for use. Any other activatable adhesive may be used to form the adhesive covered batting sold as a unit for application by the quilter. According to a preferred embodiment of the system and method, both surfaces of the batting are fully covered with adhesive. According to other alternative embodiments, the system may have the adhesive applied by the quilter by a suitable spray unit or other applicators which can establish the desired adhesive coating. According to other alternative embodiments (not considered as a particularly practical system), a thin adhesive film may be applied to the cloth cover (which would normally require care in the application and would not provide the final advantages of the system and method disclosed as the preferred embodiment and the other possible variations). The inactive adhesive may also be applied in various patterns which do not form a complete and continuous adhesive over the batting face, but which properly secure the covers and batting to permit application of the desired decorative cover.

Generally in accordance with a preferred embodiment of the system and method of the present invention, the covers are attached to the batting by an inactive adhesive which is activated after assembly of the batting and covers to secure the batting in the necessary position between the covers without the necessity for sewing or other known prior art means which generally require a manual time consuming task for creating and subsequent removal of the temporary attaching means. The inactive adhesive by proper selection may remain part of quilt or removed by washing or the like.

According to a preferred embodiment of the method and system, the opposite surfaces of the batting are covered with a thin film of the inactive adhesive and preferably a heat activated inactive adhesive. The inactive adhesive is applied to the batting and the batting sold with the adhesive thereon. Instructions for assembling the covers and activating the inactive adhesive, as by passing a hot iron over the cover are given to secure the cover to the batting. The quilt may then be completed by the known methods of connecting the covers and batting to produce the desired decorative covers.

According to any preferred embodiment of the system and method, an adhesive is interposed between a quilt cover and the adjacent batting to at least temporarily attach the cover to the batting. The bonded quilt covers and batting are then fixedly attached to each other by the usual quilting method and systems to form a decorative cover. The adhesive bonding is preferably applied to attach both covers to the batting for at least the temporary securing of the covers for any subsequent type of final securing the covers to the batting.

According to a particularly preferred embodiment, the adhesive is a heat activated material which is readily activated by the heat of a typical well-known hot ironing unit used for pressing clothing. Other energy or other adhesives may be used within the system and method; the heat activated adhesive using a typical hot iron will be readily understood by a typical quilter.

The system and method is intended to reduce the time to complete the quilt and to particularly eliminate the time consuming and tedious steps of manually connecting the temporary attachment of the cover and the subsequent removal of the temporary attachment.

According to any preferred embodiment, the system and method will provide a most effective and useful temporary adhesive cover attachment for producing the necessary final decorative connection of the covers to the batting. However, variations of the method of producing and applying an effective adhesive type for subsequent assembly during the quilting steps of attaching the covers to the batting may be found by those skilled in the art who may review this disclosure and are intended to be within the scope and teaching of the present invention and accompanying claims.

What is claimed is:

1. In a commercially available product of a type having a batting with opposing faces and a softness and flexibility configured for use in the formation of a quilt, the quilt having at least one cover to be securably attached to the batting, the improvement comprising:
   a composite member sold in at least one desirable size for making a quilt and formed of the batting and a non-woven adhesive material as an article of manufacture;
   wherein the batting consists of a fibrous material;
   wherein the non-woven adhesive material comprises a water-soluble material and is effective to form a removable bond at the opposing faces of the batting;
   so that the quilt may be formed by at least temporary attachment of the cover to the batting by the bond and the bond is removable after formation of the quilt.

2. The product of claim 1 wherein the non-woven adhesive material comprises an activatable adhesive to provide attachment of the batting at an interface with the cover.

3. The product of claim 2 wherein the non-woven adhesive material is activatable by an application of heat.

4. The product of claim 1 wherein the non-woven adhesive material is applied to the batting.

5. The product of claim 1 wherein the bond is removable by washing the quilt.

6. The product of claim 1 wherein the batting consists of a cotton material, a polyester material, or a cotton and polyester material.

7. The product of claim 1 wherein the adhesive material is applied upon at least one of the opposing faces of the batting.

8. The product of claim 1 wherein the adhesive material is configured to be selectively activated when applying the cover for attachment to the batting.

9. The product of claim 1 wherein the activatable adhesive is an inactive adhesive configured to be selectively activated.

10. The product of claim 1 wherein the adhesive material is applied to at least one of the opposing faces of the batting as a thin layer of adhesive.

11. The product of claim 1 wherein the adhesive material is applied by spraying the adhesive.

12. The product of claim 1 wherein the adhesive material is applied to substantially all of an interface between the at least one cover and the batting.

13. The product of claim 1 wherein the composite member is mass-produced.

14. The product of claim 1 wherein the adhesive material is selectively applied to at least one of the opposing faces of the batting as a pattern.

15. The product of claim 1 wherein the adhesive material is randomly applied to at least one of the opposing faces of the batting.

16. The product of claim 1 wherein the bond formed by the adhesive material is removable by machine washing.

17. The product of claim 1 wherein the adhesive material allows for the batting to maintain softness and flexibility.

18. The product of claim 1 wherein the commercially available product provides instructions for application of heat when attaching the cover to the batting.

19. The product of claim 1 wherein the bond formed by the adhesive material is removable by a hand washing.

20. The product of claim 1 wherein the fibrous material comprises a cotton material or a polyester material.

21. In a commercially available product of a type having a batting with opposing faces and a softness and flexibility and configured for use in the formation of a quilt, the quilt having at least one cover to be securably attached to the batting, the improvement comprising:
   a composite member sold in at least one desirable size for making a quilt and formed of the batting and a non-woven water-soluble adhesive material as an article of manufacture;
   wherein the batting consists of a fibrous material;
   wherein the non-woven water-soluble adhesive material is effective to form a removable bond at the opposing faces of the batting;
   so that the quilt may be formed by at least temporary attachment of the cover to the batting by the bond and the bond is removable by washing the quilt after formation of the quilt.

22. The product of claim 21 wherein the adhesive material is an activatable adhesive to provide attachment of the batting at an interface with the cover.

23. The product of claim 21 wherein the adhesive material is applied to the batting.

24. The product of claim 21 wherein the adhesive material is applied to at least one of the opposing faces.

25. The product of claim 21 wherein the adhesive material is configured to be activated when applying the cover for attachment to the batting.

26. The product of claim 22 wherein the adhesive material is an inactive adhesive configured to be selectively activated.

27. The product of claim 22 wherein the activatable adhesive is selectively activated by heating.

28. The product of claim 27 wherein the heating is provided by an iron.

29. The product of claim 21 wherein the adhesive material is applied to at least one of the opposing faces of the batting as a thin layer of adhesive.

30. The product of claim 21 wherein the adhesive material is applied to the baiting by spraying.

31. The product of claim 21 wherein the adhesive material is applied to substantially all of an interface between the cover and the batting.

32. The product of claim 21 wherein the adhesive material provides an interface for attachment of the cover.

33. The product of claim 22 wherein the activatable adhesive is selectively applied to a region of the batting.

34. The product of claim 21 wherein the adhesive material is selectively applied to at least one of the opposing faces of the batting as a pattern.

35. The product of claim 21 wherein the adhesive material is randomly applied to at least one of the opposing faces of the batting.

36. The product of claim 21 wherein the bond formed by the adhesive material is removable by hand washing.

37. The product of claim 36 wherein the bond formed by the adhesive material is removable by machine washing.

38. The product of claim 21 wherein the composite member is needle-punched.

39. The product of claim 21 wherein the adhesive material allows for the batting to maintain softness and flexibility.

40. The product of claim 21 wherein the adhesive material may remain a part of the quilt.

41. The product of claim 21 further comprising instructions with the batting.

42. The product of claim 21 wherein the composite member of the batting with adhesive is mass-produced.

43. The product of claim 21 further comprising instructions for application of heat when attaching the cover to the batting.

44. The product of claim 21 wherein the batting is a thick material.

45. The product of claim 21 wherein the batting comprises at least one of cotton or polyester.

* * * * *